United States Patent [19]

Dodge, Jr.

[11] Patent Number: 4,542,884
[45] Date of Patent: Sep. 24, 1985

[54] REMOVABLE DOUBLE ACTION ROPE GRIP

[76] Inventor: Cleveland E. Dodge, Jr., R.D. 1-7, Pownal, Vt. 05261

[21] Appl. No.: 605,074

[22] Filed: May 3, 1984

Related U.S. Application Data

[63] Continuation-in-part of Ser. No. 501,623, Jun. 6, 1983.

[51] Int. Cl.$^4$ .............. A47L 3/04; A62B 1/16; B65H 59/16
[52] U.S. Cl. .......................... 254/391; 182/5; 188/65.1; 254/405; 254/411
[58] Field of Search .............. 254/391, 405, 407, 409, 254/411, 412, 415; 188/65.1, 65.2; 182/5, 71, 72, 191

[56] References Cited

U.S. PATENT DOCUMENTS

| | | | |
|---|---|---|---|
| 898,318 | 9/1908 | Carter | 254/391 X |
| 2,148,590 | 2/1939 | Tamarin | 188/65.1 |
| 2,187,361 | 1/1940 | Palsson | 188/65.1 |
| 3,852,943 | 12/1974 | Healy | 182/5 X |
| 3,876,036 | 4/1975 | Sweet | 188/65.2 X |
| 3,948,362 | 4/1976 | Greest | 188/65.2 |
| 4,071,926 | 2/1978 | Sweet et al. | 182/8 X |
| 4,180,118 | 12/1979 | Vecchiarelli | 188/65.1 X |

FOREIGN PATENT DOCUMENTS

| | | | |
|---|---|---|---|
| 76316 | 8/1953 | Denmark | 254/391 |
| 1077068 | 7/1967 | United Kingdom | |

Primary Examiner—Stuart S. Levy
Assistant Examiner—Joseph J. Hail, III
Attorney, Agent, or Firm—Handal & Morofsky

[57] ABSTRACT

A rope grip which comprises a shell (12) and a plate (16) defining a first gripping surface and a cylinder (20) defining a second gripping surface is disclosed. The two surfaces are in a facing spaced relationship and define a passage (30) for receiving a rope. The cylinder travels in an angular field of motion with respect to the plate which causes a rope of appropriate size to become jammed between the plate and the cylinder depending upon the position of the cylinder. An operating arm (18) is mechanically coupled to the cylinder in order to control its position and accordingly, the distance between the surfaces of the plate and the cylinder.

6 Claims, 2 Drawing Figures

REMOVABLE DOUBLE ACTION ROPE GRIP

CROSS REFERENCE

This application is a continuation in part of U.S. application Ser. No. 501,623 filed on June 6, 1983, of Cleveland E. Dodge, Jr., for a *REMOVABLE DOUBLE ACTION ROPE GRIP*, the disclosure of which is incorporated herein by reference.

TECHNICAL FIELD

The invention relates to a rope grip for protecting workman at high altitudes from falling to the ground.

BACKGROUND ART

In the past, much effort has been devoted to the development of fall prevention devices known as rope grips. The desirable qualities of such a device fall into several categories including safety, reliability, versatility and convenience of use. Dodge Machine Company, Inc. currently offers a rope grip with a number of desirable qualities, for example the rope grip is manufactured from large, simple pieces of material which distribute the impact of a fall through relatively massive pieces of metal providing strength, reliability and safety. It can be attached to a person by means of a lanyard so that it can be moved up and down the rope without the person having to place his hand on the grip, which makes the rope grip convenient to use. This rope grip can be placed over a rope anywhere along the length of a rope, providing for further convenience. This rope grip is versatile, it can be used with ropes having a variation in diameter of as much as a quarter of an inch.

Another commercially available rope grip is the Barrow Hepburn Everest Rope Grip, patented in the U.K. with Patent No. 1,077,068. This rope grip operates by means of three small steel balls through which the rope is passed. When the rope grip begins to fall rapidly down a rope, the friction of the rope against the balls draws them into a conical shaped housing which jams the rope between the three balls. While this device offers advantages over many others in terms of fail-safe operation, it too has practical drawbacks. This device can only be used with a very narrow tolerance in rope diameter. The rope must be threaded through the rope grip, as it cannot be opened for placing the grip on the rope, nor can it be opened for cleaning. It is not possible to move this grip past a splice or a knot in the rope. Thus, this rope grip is in many ways inconvenient to use. A device such as this one, which is inconvenient to use, does not provide maximum effectiveness since it is likely that a person engaged in an activity where a rope grip should be used will not use such a device because it interferes with the activity.

The available rope grips, such as those noted above, provide varying degrees of fail-safe operation. This feature however, is gained at the expense of versatility and convenience. In accordance with the present invention, these and other disadvantages of the prior art are minimized. The present invention provides a high degree of fail-safe operation while remaining versatile and convenient to use.

DISCLOSURE OF INVENTION

The inventive rope grip comprises two gripping surfaces defining a passage for receiving a rope, means for supporting one of said gripping surfaces at a variable distance from the other gripping surface and an operating arm to influence the position of the movable gripping surface.

The gripping surfaces of the inventive rope grip are in a spaced facing relationship to one another. One of the gripping surfaces is movable with respect to the other gripping surface in such a manner that the movable gripping surface is closer to the other gripping surface at one extremety of its motion than at the other extremety of its motion. This provides a passage for a rope of variable cross section. Depending on the size of the rope and the position of the gripping surfaces a rope may be jammed between the gripping surfaces, arresting the movement of the rope grip along the rope. The device is constructed so that the force of the rope on the movable gripping surface acts in conjunction with the force exerted on the operating arm by a user.

As illustrated below the inventive rope grip offers many advantages over available rope grips. It can be made from a plurality of parts where it can be easily disassembled, or opened to put around a rope.

BRIEF DESCRIPTION OF DRAWINGS

A device constructed in accordance with the present invention is described in detail below in conjunction with the drawings which illustrate an embodiment of the invention in which.

BEST MODE FOR CARRYING OUT THE INVENTION

Figure 1:
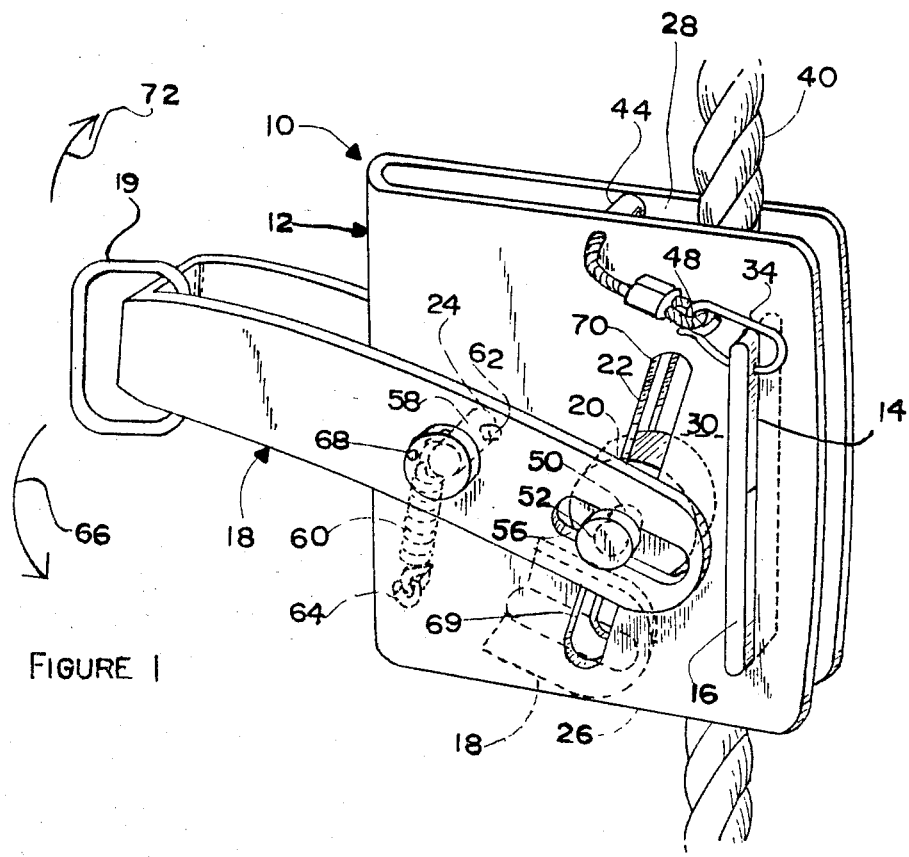
FIG. 1 is a perspective view of the inventive grip.

Referring to FIG. 1, the inventive rope grip 10 comprises generally a shell 12, with slots 14, a removable plate 16, an operating arm 18 and a cylinder 20. These features will be described in detail below.

Figure 2:
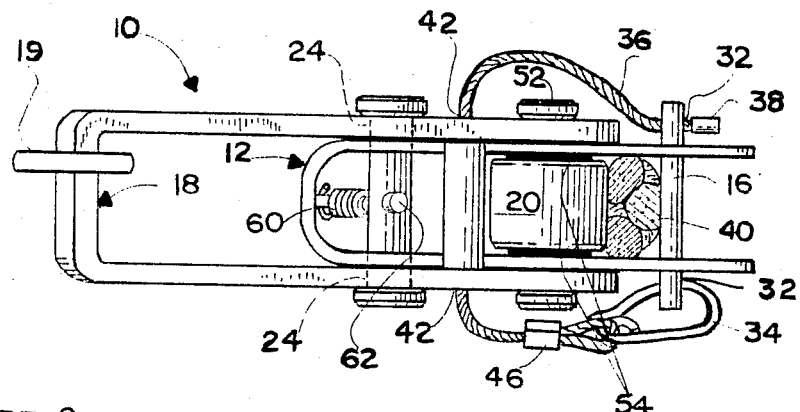
FIG. 2 is a top plan view of the inventive grip.

The shell, in accordance with the present invention has the first engagement means in the form of slots 14 for securing removable plate 16, a second engagement means in the form of slots 22 for securing cylinder 20, and a third engagement means in the form of holes 24 for securing operating arm 18. The shell surrounds an entrance area 26 and exit area 28 with the volume between these areas defining a passage 30 for the rope. Referring to FIG. 2, plate 16 has two holes 32 to help secure the plate. The width of plate 16 is such that holes 32 may be disposed on opposite sides of shell 12 as shown in FIG. 2. The plate is held in position by a securing ring 34 and a cable 36 which has a wire nut 38 on one end. That is, the ring restricts motion of the plate in one direction, while cable 36 restricts motion in the opposite direction.

Cable 36 is secured to ring 34 by means of a clamp 46 and is prevented from passing through hole 32 by wire nut 38 which is larger than hole 32. The cable passes through a pair of holes 42 and a bushing 44 which is held in position by the cable. Thus, when assembled about a rope 40, motion of the rope with respect to device 10 will be limited by plate 16, bushing 44, and cylinder 20.

It should be noted that ring 34, apart from being configured so as to form a nearly closed loop, has a curved end 48. Because of the loop, pressure must be applied to ring 34 to remove it from hole 32. In addition, due to its reversed curvature, end 48 makes it necessary to change the orientation of ring 34 several times as it is being withdrawn from hole 32. Accordingly, it is very unlikely that ring 34 will inadvertently be removed from hole 32. When ring 34 is removed from hole 32 and plate 16 is withdrawn the plate remains attached to shell 12 by virtue of cable 36. Clamp 46 is larger than hole 42, and therefore it is very unlikely that any removable part will be misplaced.

Turning back to FIG. 1, cylinder 20 is rotably mounted about a pin 50. Pin 50 has two heads 52 disposed about either side of shell 12 limiting its travel. However, pin 50 being smaller than slot 22 is free to move up and down in slots 22. A pair of washers 54, as shown in FIG. 2 may be added if desired. It should be noted that heads 52 are outwardly disposed with respect to slots 56 and arm 18.

Operating arm 18 is secured to shell 12 by virtue of a pin 58 which passes through holes 24. It will be noted that pin 58 is of such dimension so as to allow arm 18 to rotate with respect to shell 12. Pin 58 is fixedly joined to arm 18.

A spring 60 is secured to a rivet 62 in pin 58 on one end and at the other end to an eyelet 64. The spring is short enough so that operating arm 18 is urged in the direction indicated by an arrow 66. This, of course, is a consequence of the fact operating arm 18 is fixedly connected to pin 58. One mode of accomplishing this fixed relationship is illustrated by a small pin 68, shown in FIG. 1. Small pin 68 passes through the head of pin 58 and into operating arm 18.

As FIG. 2 indicates, when plate 16 is not disposed through slots 14 passage 30 is no longer physically defined as a channel of closed polygonal cross-section. Therefore, it is not necessary to thread a rope through the inventive rope grip, it may be placed over a rope anywhere over the length of a rope before plate 16 is secured in position about the rope. In a like manner the inventive rope grip can be conveniently removed from a rope. This is one advantage of the inventive rope grip.

The preferred embodiment of the inventive rope grip consists of the parts described above. Parts are arranged substantially as illustrated in FIGS. 1 and 2 and as further detailed below.

As shown in FIG. 1, the position of cylinder 20 is determined by the intersection of slots 56 and 22 respectively. Slots 22 are angularly disposed with respect to plate 16. When pin 50 and cylinder 20 are disposed at the lower end 69 of slot 22 passage 30 is of maximum cross section. See phantom lines in FIG. 1. Thus a rope, of suitable dimension, such as rope 40 is free to move through channel 30 as the cylinder is in a lower position. However, if the pin were disposed close to the upper end 70 of slot 22, as illustrated, the cross sectional area of passage 30 would be much smaller and rope 40 is jammed between the surface of cylinder 20 and the surface of plate 16. Due to spring 60, when there is no external force on operating arm 18, the position of cylinder 20 is at the upper position, where the cross sectional area of the passage is minimized.

Because of slots 56, cylinder 20 has a variable axis of rotation about pin 58. Slots 56 are of such dimension so as to allow the cylinder to travel to the extremes of slots 22.

During use, operating arm 18 is attached to a belt or harness on the workman. This can be accomplished by means of ring 19 or any other suitable method. Due to the weight of the inventive rope grip, this urges arm 18 in direction 72 so as to hold cylinder 20 away from the rope, which in turn, allows the grip to slide up and down by the rope. If he falls, arm 18 is urged by the spring in the direction of arrow 66, locking grip 10 in position on rope 40.

The inventive rope grip as described above offers many advantages. It need not be activated by a force on the operating arm since spring 60 is urging it into a clamping position. Accordingly, a high degree of fail safe operation is obtained. In the event of a fall the rope will move rapidly through the rope grip toward the exit area 28. The friction of the rope intermittantly hitting cylinder 20 rotates the cylinder which causes it to walk upwards due to the rotation of pin 50 against the slot 22. This moves the cylinder upward toward the exit area further restricting the channel and jamming the rope. Of course, a third method of activating the rope grip is to apply a force on the operating arm in the direction indicated by arrow 66.

The surface of flat plate 16, and the surface of cylinder 20 are substantially parallel. This allows the inventive rope grip to be used with a substantial range of rope sizes, since the gripping of the rope takes place between two parallel surfaces which will equally distribute the gripping force over the ropes surface. Indeed, the inventive rope grip has been found to operate well with a range of rope sizes, having a variation in diameter of as much as a quarter of an inch. In order to move the rope grip along a rope, operating arm 18 must be urged in an upward direction so that cylinder 20 is biased away from the rope, towards entrance area 26. In this way unwanted jamming is prevented.

It is noted that force on the operating arm will work in conjunction with the force on the cylinder during a fall impact because the operating arm would be ordinarily attached to a falling person and pulled downwards. Moreover, the force of the rope on the cylinder urges the cylinder towards upper position 70. Force of the impact will be absorbed by the relatively large, massive pieces of metal comprising plate 16, cylinder 20, shell 12, pins 50 and 58 and operating arm 18.

While an illustrative embodiment of the invention has been described, various modifications will be obvious to those skilled in the art. For example, in lieu of mounting cylinder 20 in a pair of elongated slots various other tracking methods could be used. For example, a lipped groove fitted about a pin with a suitably sized head could accomplish essentially the same function. Such modifications are within the spirit and scope of the present invention which is limited and defined only by the appended claims.

I claim:

1. A rope grip, comprising:
   (a) shell means defining a pair of rope guiding surfaces in facing spaced relationship to each other;
   (b) plate means having upper and lower extremities disposed between said two rope guiding surfaces and secured to said surfaces, said first and second surfaces and said plate means defining a generally U-shaped channel wherein said plate means is removable and comprises a plate which is mounted in a pair of mating mounting means in said shell means and retainer means for keeping said plate in position;
   (c) channel restricting means disposed in said channel in facing spaced relationship to said plate means;
   (d) mounting means associated with said channel restricting means;
   (e) track means for mating with said mounting means and guiding said mounting means and said channel restricting means along a path between a first point proximate to said upper extremity of said plate means, said first point being disposed at a first distance from said upper extremity, and a second point proximate said lower extremity of said plate means, said second point being disposed at a second distance from said lower extremity, said second distance being greater than said first distance;

(f) arm means coupled to said mounting means for moving said mounting means and said channel restricting means along said track means between said first and second points wherein said arm means has a slot therein and said mounting means is mounted in said slot;

(g) rotational mounting means fixedly secured with respect to said shell means for rotatably supporting said arm means at a third point removed from said path; and (h) spring means for urging said arm in a direction where said arm in turn urges said mounting means and said channel restricting means toward said upper extremity.

2. A rope grip as in claim 1, wherein said retainer means comprises a cable which is secured to one side of said plate and on the other side is removably securable.

3. A rope grip as in claim 1, wherein said track means comprises a pair of elongated straight slots in said guiding surfaces.

4. A rope grip as in claim 1, wherein said channel restricting means is a cylinder.

5. A rope grip as in claim 1, wherein said mating mounting means comprises a pair of elongated holes, one hole disposed in each of said rope guiding surfaces.

6. A rope grip as in claim 1, wherein said channel restricting means is of circular cross-section mounted by said mounting means for rotation on said track means.

* * * * *